United States Patent
Döring

(10) Patent No.: US 11,632,966 B2
(45) Date of Patent: Apr. 25, 2023

(54) INDUSTRIAL BUTTER WITH INCREASED HARDNESS (II)

(71) Applicant: DMK Deutsches Milchkontor GmbH, Zeven (DE)

(72) Inventor: Sven-Rainer Döring, Zeven (DE)

(73) Assignee: DMK Deutsches Milchkontor GmbH, Zeven (DE)

( * ) Notice: Subject to any disclaimer, the term of this patent is extended or adjusted under 35 U.S.C. 154(b) by 208 days.

(21) Appl. No.: 16/412,973

(22) Filed: May 15, 2019

(65) Prior Publication Data

US 2019/0350216 A1 Nov. 21, 2019

(30) Foreign Application Priority Data

May 18, 2018 (EP) ..................................... 18173090

(51) Int. Cl.
  *A23C 15/06* (2006.01)
  *A23C 15/12* (2006.01)
  *A21D 13/80* (2017.01)

(52) U.S. Cl.
  CPC .............. *A23C 15/06* (2013.01); *A23C 15/12* (2013.01); *A21D 13/80* (2017.01)

(58) Field of Classification Search
  CPC ....... A23C 15/12; A23C 15/06; A23C 15/126; A23C 15/04; A21D 2/165; A21D 13/16; A21D 13/80
  See application file for complete search history.

(56) References Cited

FOREIGN PATENT DOCUMENTS

| DE | 767 269 C | | 3/1952 |
| JP | 2007-060913 A | | 3/2007 |
| JP | 2007060913 A | * | 3/2007 |
| JP | 5-601427 B2 | | 10/2014 |
| WO | 2006/011331 A1 | | 2/2006 |

OTHER PUBLICATIONS

Ronholt et al., "The Effect of Capacity, Rotational Speed and Storage on Crystallization and Rheological Properties of Puff Pastry Butter," J Am Oil Chem Soc 91(1), 2013, pp. 29-38.

* cited by examiner

*Primary Examiner* — Nikki H. Dees
*Assistant Examiner* — Assaf Zilbering
(74) *Attorney, Agent, or Firm* — Dilworth & Barrese, LLP

(57) ABSTRACT

Industrial butter with increased hardness is suggested, obtainable or obtained by
  (a) separating raw milk into a skimmed milk fraction and a cream fraction;
  (b) while adding water, separating the cream fraction of step (a) into a milk phase and an aqueous protein-lactose phase;
  (c) adding hard fat to the milk phase of step (b), and homogenising it; and
  (d) cooling the homogenised mass while shearing.

13 Claims, No Drawings

INDUSTRIAL BUTTER WITH INCREASED HARDNESS (II)

FIELD OF THE INVENTION

The invention is in the field of dairy products and relates to novel industrial butter with increased hardness, a process for its production, its use for the production of specific baked goods, and the respective baked goods.

TECHNOLOGICAL BACKGROUND

Puff pastry and similar products such as croissants or Danish pastry are among the most popular baked goods.

Puff pastry dough (also known as Pâte feuilletée) is a multi-layer laminated dough. Butter, less commonly also another solid fat such as margarine, is incorporated into the basic dough which is composed of flour, salt, and water, by repeated rolling and folding, which is referred to as "sheeting".

During the baking process, the dough rises in a light and flaky form. As a result of the heat from baking, the water present in the dough evaporates, allowing the dough to expand such that the baked good rises. The layers of fat act like a barrier in the process; they do not allow the vapour to leave, enclosing it in the layer of dough until the dough structure is baked, reaching a stable state. In doing so, the rising (increase of volume) of the dough is only caused by the vapour that is created within the dough, and not by any additional leavening agent or yeast. Therefore, this method of production is referred to as "mechanical leavening".

Puff pastry dough is mostly taste-neutral, depending on the natural taste of the fats used, and is produced without the addition of sugar. Therefore, it is suitable for both sweet and savoury baked goods.

Puff pastries are distinguished by the way the butter, or the fat, is incorporated into them:

German puff pastry dough: here, the layers of fat are inside, the basic dough encloses them (according to the Principles for Viennoiseries laid down in the German Guidelines for Food—Deutsches Lebensmittelbuch; it contains at least 62 kilogrammes of butter, milkfat products, or margarine, or practically water-free fats, based on 100 kilogrammes of cereal products);

French puff pastry dough: here, the layers of fat enclose the basic dough. The advantage is in that the dough will not dry out or develop a crust, because the layer of fat is outside;

Dutch puff pastry dough: here, the fat is incorporated into the dough in the form of cubes (in a cool state), the dough is layered without allowing any breaks (therefore it is also referred to as blitz pastry), and is predominantly processed to puff pastry flan cases, as it does not raise that well (on the sides).

Dutch puff pastry dough occupies a special position due to its compact structure, as the baked goods can be cut after baking. Due to their compactness, these doughs are suitable for special types of baked goods such as crumb cake with fruit and a puff pastry base (German: Prasselkuchen), flan cases, and the top of cakes.

It is mostly the dough that determines the differences between puff pastry and other laminated baked goods such as Danish pastry, or also croissants. No yeast is added to puff pastry dough, but yeast is used in Danish pastry as a leavening agent. In addition, the doughs contain sugar, milk, and other ingredients as needed and depending on the recipe. Laminated Yufka dough, Phyllo dough, or Moussaka dough is widely used in the Turkish, Greek, and Arabic cuisine and is very similar to puff pastry dough. Variations using oil and yeast are also known.

It is important that the finished baked good does not taste strongly of butter or fat on the one hand, but that it leaves a buttery impression as a whole, both optically and with respect to the flavour on the other, as consumers consider this to be a sign of quality.

The market segment which includes puff pastry goods is very homogeneous, barely allowing any product variety. Commercial success is solely based on quality and price. However, consumers are certainly interested in baked goods which exhibit additional sensory or taste properties. These, however, are limited in choice: typically, they are croissants or the like, into which a core of chocolate cream or jam is subsequently injected. In this case, it is essential that the manufacture of the products is virtually exclusively performed automatically, as an alignment of the rolling rollers with millimetre precision is required to produce a homogeneous dough and a qualitatively valuable product after the baking process. Introducing any further ingredients, which also have to survive the baking process, is only suitable for these processes to a very limited degree, if at all.

The nature and certainly also the amount of the butter used have a large influence on the sensory quality of the puff pastry goods. Common industrial butter is produced by cream ripening—i.e., a sequence of heating and cooling of the cream in order to form a semicrystalline plastic mass, and subsequent classic churning—and has a hardness of about 1 N, which is too low to provide the baked goods with sufficient bite. Instead, the products are often perceived by the consumer as oily and limp. Currently, this is typically counteracted in the industry by using specific butter mixtures which are, however, complex in production, therefore making the final product considerably more expensive.

OBJECT OF THE INVENTION

A first object of the present invention was, therefore, to provide industrial butter which would have a hardness within the range of 1.5 to 4.5 N and which would not tend to oil out.

A second object consists in producing the butter with as little technical effort as possible, particularly doing without the ripening step, which is quite time-consuming, and the subsequent churning in the process.

DESCRIPTION OF THE INVENTION

A first subject-matter of the invention relates to industrial butter with increased hardness, which is obtainable or obtained by
  (a) separating raw milk into a skimmed milk fraction and a cream fraction;
  (b) while adding water, separating the cream fraction of step (a) into a milk phase and an aqueous protein-lactose phase;
  (c) adding hard fat to the milk phase of step (b) and homogenising it; and
  (d) cooling the homogenised mass while shearing.

Another subject-matter of the invention relates to a process for the production of industrial butter with increased hardness, comprising or consisting of the following steps:
  (i) separating raw milk into a skimmed milk fraction and a cream fraction;

(ii) while adding water, separating the cream fraction of step (a) into a milk phase and an aqueous protein-lactose phase;

(iii) adding hard fat to the milk phase of step (b) and subsequent homogenisation;

(iv) cooling the homogenised mass while shearing;

(v) shaping the hardened industrial butter such obtained.

Surprisingly, it was found that this manner does not only allow to obtain industrial butter with a hardness within the desired range, but both ripening and churning may be saved as time-consuming, energy-consuming and costly steps.

Separation of Raw Milk

Churning is typically based on a cream fraction which is obtained by separation while obtaining skimmed milk from raw milk or whole milk. Said cream fraction typically has a fat content of about 40% by weight and may, if necessary, be adjusted to this value by standardisation, i.e., the addition of cream from other sources.

Separation of Protein and Lactose

The cream is pasteurised or sterilised and subsequently treated with water, for example, in a separator. This may be performed at room temperature, but also in cold conditions (e.g., 8 to 12° C.) or in warm conditions (e.g., about 35 to about 85° C., and preferably at about 45 to about 65° C.). In doing so, an aqueous phase is produced, containing more than 90% by weight of the proteins and the lactose contained in the cream. A milk phase remains, which is further processed.

Addition of Hard Fat

Two effects are achieved by adding hard fat to the milk phase: on the one hand, this increases the fat content, which makes churning obsolete, at the same time, a product is obtained, which has a greater hardness and a lower tendency to oil out than conventional industrial butter (typically, 1 to 2 N) and which is thus particularly suited to produce baked goods of the croissant type.

The addition of the hard fat may be performed in a conventional agitator or kneader at room temperature or also at an increased temperature of about 25 to 45° C., as long as the fat does not start to melt. The amount added may typically be from about 2 to about 25% by weight and particularly from about 3 to about 15% by weight.

Suitable hard fats within the meaning of the present invention are technical mixtures of mono-, di- and triglycerides which are obtained, for example, on the basis of palm oil or coconut oil. Hard fats mostly contain saturated fatty acids having 10 to 18 and particularly 12 to 16 carbon atoms. From a physical perspective, they are wax-like, brittle masses with melting points of between 35 and 45° C. and iodine values of below 10.

In a preferred embodiment, so-called Anhydrous Milk Fat (AMF) or other hard milk fat fractions are added to the milk phase. AMF is liquid at above 36° C. and is solid at below 18° C., because of which it is also referred to as hard fat, at least within the present invention. Herein, this is, by definition, a fat phase which is exclusively obtained on the basis of milk from which water and any liquid non-fat products have been completely removed. The production of AMF can be performed according to various methods. The process is typically based on cream having a fat content of 40%, which is concentrated to a fat content of 75% by weight in two steps. This is followed by a phase inversion step within a homogeniser where a type of buttermilk and butter oil are obtained. The latter is then treated under vacuum conditions, obtaining AMF as a final product.

At this point, in addition to the hard fats also butter cultures may be added for the formation of flavour, or an acidification process may be performed.

Combinator Treatment

After the addition of hard fat or AMF, the homogenised, plastic mass is cooled while shearing. To do so, a scraped surface heat exchanger is particularly suitable, or particularly at least two, preferably 4 to 5 serially connected scraped surface heat exchangers, which in this arrangement are also referred to as "combinators".

In such a component, the product to be cooled is pumped into the lower end of the vertical heat exchanger and flows through the cylinder. It is constantly stirred and is removed from the cylinder wall by scrapers. Heating or cooling media are flowing within the annular gap between the heat exchange cylinder and the isolated casing.

In this manner, industrial butter with a temperature of about 10° C. is obtained at the outlet of the exchanger as a product which has a hardness within the range of about 1.5 to about 4.5 N, and particularly about 2 to about 4 N, and which may now, for example, be shaped into bars and be packaged.

INDUSTRIAL APPLICABILITY

A further subject-matter of the invention relates to bake-off products, comprising or consisting of (a) a dough phase, and (b) hardened industrial butter as described above.

The dough phase, preferably, is a standard puff pastry as initially described.

A further subject-matter of the invention relates to a method of production of baked goods, preferably croissants, comprising the following steps:

(i) providing a dough phase;

(ii) providing hardened butter as described above, (iii) incorporating the hardened butter into the dough phase, obtaining a bake-off product;

(iv) baking the bake-off product.

Alternatively, the bake-off product may be folded repeatedly such that a layered structure is obtained, as is usual for puff pastries.

Eventually, the present invention also comprises the use of butter as described above for the production of baked goods, particularly puff pastry goods, and more preferably croissants.

EXAMPLES

Example 1

Producing Industrial Butter with Hard Fat 500 kg of cream with a fat content of 40% by weight were placed into a separator and were washed with 500 kg of water. 750 kg of an aqueous phase were obtained, which contained 2.1% by weight protein and 2.9% by weight lactose, and which was further processed separately. The remaining milk phase was transferred into a stirring vat with a kneader where 25 kg of palm fat were added to it in portions. The mixture was heated to 35° C. and kneaded until a homogeneous plastic mass was formed. The mass was continuously placed onto a combinator, consisting of 4 serially connected scraped surface heat exchangers of the type SPX (GERSTENBECK-SCHRÖDER). The combinator had four cooling zones, i.e., 27° C./18° C./11° C./14° C., and was operated at a pressure of 17.3 bar. Industrial butter of a temperature of 6° C. was obtained, having a hardness of 2.7 N after crystallising.

Example 2

Producing Industrial Butter with AMF 500 kg of cream with a fat content of 40% by weight were placed into a separator and were washed with 500 kg of water. 750 kg of an aqueous phase were obtained, which contained 2.0% by weight protein and 2.8% by weight lactose, and which was further processed separately. The remaining milk phase was transferred into a stirring vat with a kneader where 15 kg of AMF were added to it in portions. The mixture was kneaded at room temperature until a homogeneous plastic mass was formed. The mass was continuously placed onto a combinator, consisting of 4 serially connected scraped surface heat exchangers of the type SPX (GERSTENBECK-SCHRÖDER). The combinator had four cooling zones, i.e., 19° C./15° C./9° C./12° C., and was operated at a pressure of 18.3 bar. Industrial butter of a temperature of 6° C. was obtained, having a hardness of 1.65 N after crystallising.

The invention claimed is:

1. Industrial butter with increased hardness, obtained by a process consisting of
   (a) separating raw milk into a skimmed milk fraction and a cream fraction;
   (b) while adding water, separating the cream fraction of step (a) into a milk phase and an aqueous protein-lactose phase, which aqueous protein-lactose phase contains more than 90% by weight of the proteins contained in the cream fraction;
   (c) adding anhydrous milk fat to the milk phase of step (b) in an amount of about 2% by weight to about 25% by weight, and homogenising it; and
   (d) cooling the homogenised mass while shearing to obtain an industrial butter having a hardness of about 1.5 to about 4.5 N at a temperature of about 10° C., and which industrial butter has a lower tendency to oil than an industrial butter obtained from a process employing ripening and churning steps.

2. The industrial butter of claim 1, wherein the anhydrous milk fat is added to the milk phase of step (b) in an amount of about 3% by weight to about 15% by weight.

3. The industrial butter of claim 1, wherein the anhydrous milk fat is added to the milk phase of step (b) as hard fat.

4. The industrial butter of claim 1, wherein the homogenised mass of step (c) is subjected to cooling within at least two serially connected scraped surface heat exchangers.

5. A method, consisting of the following steps:
   (i) separating raw milk into a skimmed milk fraction and a cream fraction;
   (ii) while adding water, separating the cream fraction of step (i) into a milk phase and an aqueous protein-lactose phase, which aqueous protein-lactose phase contains more than 90% by weight of the proteins contained in the cream fraction;
   (iii) adding anhydrous milk fat to the milk phase of step (ii) in an amount of about 2% by weight to 25% by weight, and subsequently homogenising;
   (iv) cooling the homogenised mass while shearing; and
   (v) shaping the hardened industrial butter thus obtained to obtain an industrial butter having a hardness of about 1.5 to about 4.5 N at a temperature of about 10° C.

6. The method of claim 5, wherein cream is used, having a fat content of at least 30% by weight.

7. The method of claim 5, wherein the anhydrous milk fat is added to the milk phase of step (ii) in an amount of about 3% by weight to about 15% by weight.

8. The method of claim 5, wherein the anhydrous milk fat is added to the milk phase of step (ii) as hard fat.

9. The method of claim 5, wherein the homogenized mass of step (iii) is subjected to cooling within at least two serially connected scraped surface heat exchangers.

10. A bake-off product, comprising
    (a) a dough phase, and
    (b) butter of claim 1.

11. The bake-off product of claim 10, wherein the dough phase is a standard puff pastry.

12. A method for the production of baked goods, comprising the following steps:
    (i) providing a dough phase;
    (ii) providing the industrial butter of claim 1;
    (iii) incorporating the industrial butter into the dough phase, obtaining a bake-off product; and
    (iv) baking the bake-off product.

13. The method of claim 12, wherein the baked goods are puff pastry good.

* * * * *